United States Patent [19]

Avery

[11] Patent Number: 4,860,357

[45] Date of Patent: Aug. 22, 1989

[54] BINARY AUTOCORRELATION PROCESSOR

[75] Inventor: James M. Avery, Austin, Tex.

[73] Assignee: NCR Corporation, Dayton, Ohio

[21] Appl. No.: 762,234

[22] Filed: Aug. 5, 1985

[51] Int. Cl.[4] .......................... G10L 9/08; G10L 7/08; G06F 15/336

[52] U.S. Cl. .......................... 381/41; 381/43; 364/728.07

[58] Field of Search .......................... 381/41–50, 381/36–40; 364/728, 513.5, 728.07; 382/42

[56] References Cited

U.S. PATENT DOCUMENTS

| | | | |
|---|---|---|---|
| 4,015,088 | 3/1977 | Dubnowski | 381/49 |
| 4,071,903 | 1/1978 | Head et al. | 364/728 |
| 4,161,625 | 7/1979 | Katterfeldt et al. | 381/49 |
| 4,255,795 | 3/1981 | Hechtenberg | 364/728 |
| 4,282,405 | 8/1981 | Taguchi | 364/513.5 |
| 4,404,645 | 9/1983 | Elings et al. | 364/728 |
| 4,477,925 | 10/1984 | Avery et al. | 381/43 |
| 4,593,378 | 6/1986 | McWhirter et al. | 364/728.07 |
| 4,715,065 | 12/1987 | Parker | 381/46 |
| 4,775,951 | 10/1988 | Iwahashi et al. | 381/49 |

*Primary Examiner*—Gary V. Harkcom
*Assistant Examiner*—John A. Merecki
*Attorney, Agent, or Firm*—Wilbert Hawk, Jr.

[57] ABSTRACT

A system for converting known speech segments into machine storable binary signals for the purpose of later attempting a match between a stored signal and an incoming signal using autocorrelation techniques. Through the use of a clipper and a sample and hold register, the system converts an incoming speech signal into a bit stream signal. Two successive groups of bits called frames are stored in separate registers. A bit-by-bit correlation is performed on the bits stored in the separate registers and a counter is indexed as a function of the correlation. A memory is provided for maintaining a record of the counts associated with each speech segment for later attempting computer pattern matching against received unknown speech segments.

2 Claims, 18 Drawing Sheets

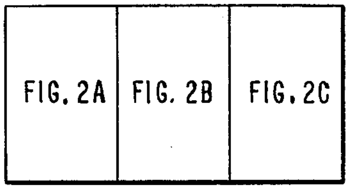
FIG. 2
FIG. 2C
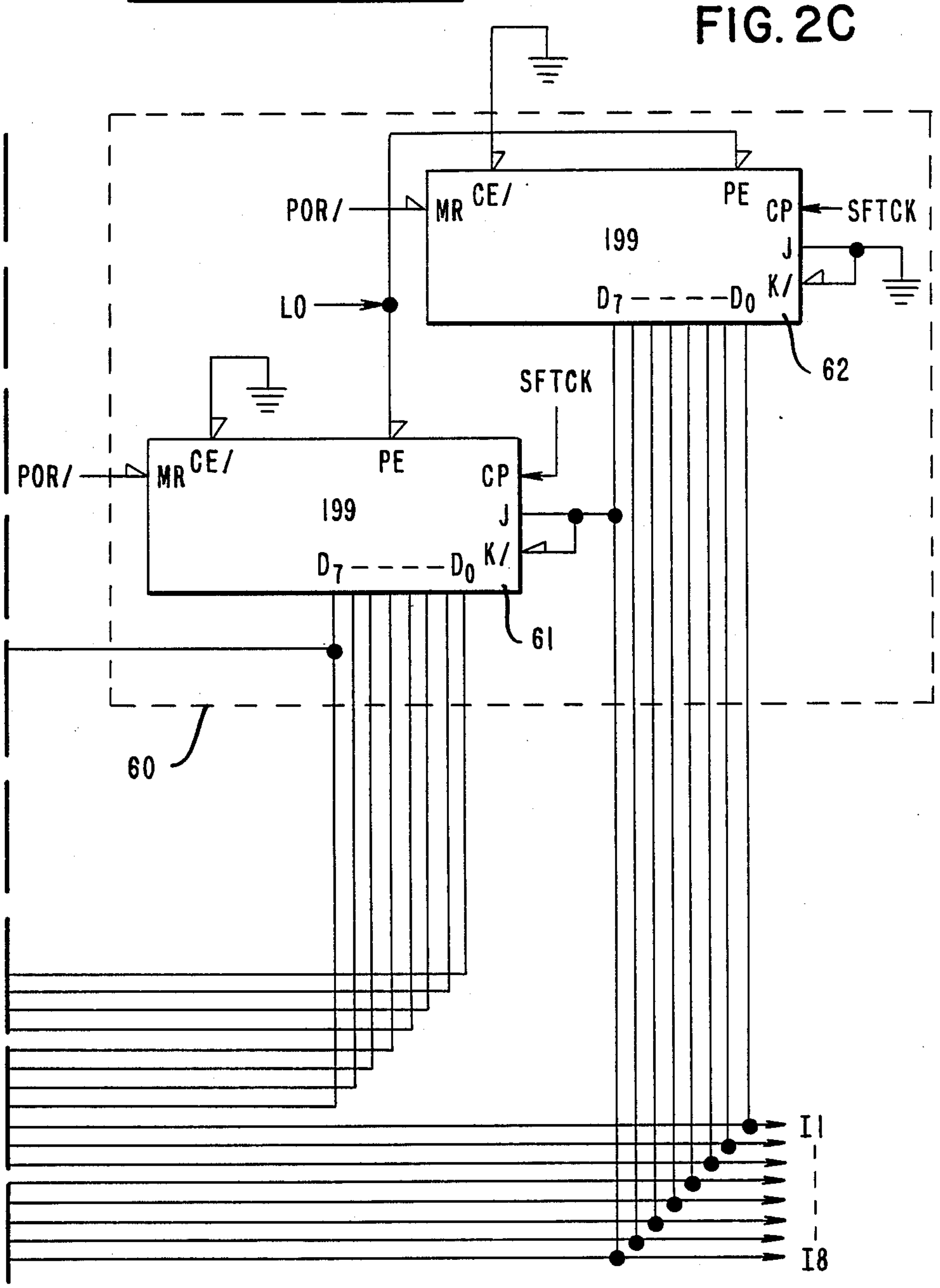

FIG. 11A

| ADDRESS | I/O EN | BADX | RADRX | X | CALEN | I/O R/W | S1 | S0 | LCLK4 | LCLK3 | LCLK2 | LCLK1 | LS2 | LS1 | LS0 | R/W | X | |
|---|---|---|---|---|---|---|---|---|---|---|---|---|---|---|---|---|---|---|
| 0 | 0 | 0001 | 00000 | 0 | 0 | 0 | 1 | 1 | 0 | 0 | 0 | 0 | 0 | 0 | 0 | 0 | 0 | ENABLE SAMPLE LOAD. |
| 1 | 0 | 0000 | 00000 | 0 | 0 | 0 | 0 | 0 | 0 | 0 | 0 | 1 | 0 | 0 | 0 | 0 | 0 | LOAD SAMPLE FRAME (16 SAMPLES) SAVE OLD RESULT. |
| 2 | 0 | 0000 | 00000 | 0 | 0 | 0 | 0 | 0 | 0 | 0 | 1 | 0 | 0 | 0 | 0 | 0 | 0 | SAVE CURRENT SAMPLE FRAME + RESET AUTOCORRELATION COUNTERS (L4). |
| 3 | 0 | 0000 | 00000 | 0 | 0 | 0 | 0 | 0 | 0 | 0 | 0 | 0 | 1 | 0 | 0 | 0 | 0 | |
| 4 | 0 | 0100 | 00101 | 0 | 1 | 0 | 1 | 1 | 0 | 0 | 0 | 0 | 0 | 1 | 0 | 0 | 0 | ENABLE AUTOCORRELATION SHIFTS (CALEN) AND SELECT RAM BUFFER/ ENABLE INTERRUPTS AND WAITE. |
| 5 | 0 | 0000 | 00000 | 0 | 1 | 0 | 0 | 0 | 0 | 0 | 0 | 0 | 0 | 1 | 0 | 1 | 0 | WRITE CONTENTS TO RAM. |
| 6 | 0 | 0111 | 00011 | 0 | 1 | 0 | 1 | 1 | 1 | 0 | 0 | 0 | 0 | 1 | 0 | 0 | 0 | SELECT NEXT RAM WRITE ADDRESS/ENABLE SUB FRAME INTERRUPT. |
| 7 | 0 | 0000 | 00000 | 0 | 0 | 0 | 0 | 0 | 0 | 0 | 0 | 0 | 0 | 1 | 0 | 1 | 0 | WRITE LAST WORD TO RAM (CADRS = 17). |
| 8 | 0 | 0000 | 00000 | 0 | 0 | 0 | 0 | 0 | 0 | 0 | 0 | 0 | 1 | 0 | 1 | 0 | 0 | SET RAM ADDRESS = 0 (CADRS = 0). |
| 9 | 0 | 0000 | 00000 | 0 | 0 | 0 | 0 | 0 | 0 | 0 | 0 | 0 | 0 | 1 | 1 | 0 | 0 | ENABLE AUTOCORRELATION COUNTER PARALLEL LOAD (L3). |
| A | 0 | 0000 | 00000 | 0 | 0 | 0 | 0 | 0 | 0 | 1 | 0 | 0 | 0 | 1 | 1 | 0 | 0 | PARALLEL LOAD AUTOCORRELATION COUNT IN COUNTERS (LCLK3). |
| B | 0 | 1011 | 01100 | 0 | 1 | 0 | 1 | 1 | 0 | 0 | 0 | 0 | 0 | 1 | 0 | 0 | 0 | ALLOW AUTOCORRELATION SHIFTS/ENABLE STK. |

| | | | | | | | | | | | | | | | | | | |
|---|---|---|---|---|---|---|---|---|---|---|---|---|---|---|---|---|---|---|
| | | | | | | | | | | | | | | | | | | INTERRUPT/SELECT RESULT REGISTER. |
| C | 0 | 0000 | 00000 | 0 | 1 | 0 | 0 | 0 | 0 | 0 | 0 | 0 | 0 | 1 | 0 | 1 | 0 | WRITE RESULT TO RAM @ (CADRS)/ DISABLE INTERRUPTS. |
| D | 0 | 1000 | 11001 | 0 | 1 | 0 | 1 | 1 | 1 | 0 | 0 | 0 | 0 | 1 | 0 | 0 | 0 | SELECT NEXT RAM ADDRESS/ENABLE INTERRUPTS. |
| E | 0 | 0000 | 00000 | 0 | 0 | 0 | 0 | 0 | 0 | 0 | 0 | 0 | 0 | 1 | 0 | 0 | 0 | DISABLE INTERRUPTS/SELECT NEW MEMORY PAGE/WRITE LAST AUTOC. RESULT. |
| F | 1 | 0000 | 00000 | 0 | 0 | 0 | 0 | 0 | 0 | 0 | 0 | 0 | 0 | 1 | 0 | 1 | 0 | PAGE/ENABLE I/O FIFO WRITE ROUTINE. |
| 10 | 1 | 0000 | 00000 | 0 | 0 | 0 | 0 | 0 | 0 | 0 | 0 | 0 | 1 | 0 | 1 | 0 | 0 | CADRS=0/DISABLE INTERRUPT/ CLEAR CADR4. |
| 11 | 1 | 0001 | 00010 | 0 | 0 | 0 | 1 | 1 | 0 | 0 | 0 | 0 | 1 | 1 | 0 | 0 | 0 | SELECT I/O PORT (L6) ENABLE INTERRUPTS. |
| 12 | 1 | 0000 | 00000 | 0 | 0 | 1 | 0 | 0 | 0 | 0 | 0 | 0 | 1 | 1 | 0 | 0 | 0 | WRITE (CADRS) TO FIFO/DISABLE INTERRUPTS. |
| 13 | 1 | 0101 | 00100 | 0 | 0 | 0 | 1 | 1 | 1 | 0 | 0 | 0 | 1 | 1 | 0 | 0 | 0 | INCR RAM ADDRESS/ENABLE INTERRUPTS. |
| 14 | 1 | 0001 | 00100 | 0 | 0 | 0 | 1 | 1 | 0 | 0 | 0 | 0 | 1 | 1 | 0 | 0 | 0 | WRITE LAST ADDRESS ON I/O RDY INTERRUPT. |
| 15 | 1 | 0000 | 00000 | 0 | 0 | 0 | 0 | 0 | 0 | 0 | 0 | 0 | 1 | 0 | 1 | 0 | 0 | RESELECT FIFO/SELECT CADRS COUNTERS = 0. |
| 16 | 1 | 0000 | 00000 | 0 | 0 | 0 | 0 | 0 | 0 | 0 | 0 | 0 | 1 | 0 | 0 | 0 | 0 | CLEAR RESULT COUNTER. |
| 17 | 1 | 0000 | 00000 | 0 | 0 | 0 | 0 | 0 | 0 | 0 | 0 | 0 | 1 | 1 | 1 | 0 | 0 | CLEAR BUFEN |
| 18 | 0 | 0000 | 00000 | 0 | 0 | 0 | 0 | 1 | 1 | 0 | 0 | 0 | 0 | 0 | 0 | 0 | 0 | RETURN TO ADDRESS 0. |

FIG. 11B

BINARY AUTOCORRELATION PROCESSOR

BACKGROUND OF THE INVENTION

The present invention is directed to speech identification systems and more particularly to a binary system, based on autocorrelation techniques, for converting known speech segments into storage coefficients which can be compared against unknown received speech segments for recognition or verification purposes.

In communication, data processing and control systems, it is desirable to utilize speech as a direct input for commands, e.g., to activate machine functions in computers, automatic teller machines and the like. Because of the complex nature of speech, its considerable variability from speaker to speaker and from time-to-time for the same speaker it is difficult to attain reliable recognition of speech segments.

A number of systems have been developed for correlating segments of a bit stream—one such system is described in U.S. Pat. No. 4,071,903 entitled, "Autocorrelation Function Factor Generating Method and Circuitry Therefor" by S. M. Head, et al. In that patent, a bit stream is directed along two paths, one providing an N bit delay and the other an M-bit delay. The most recent received bit is correlated with the delayed bits and the product is applied to a bidirectional digital counting circuit to form an autocorrelation function factor.

Another system of interest is disclosed in U.S. Pat. No. 4,161,625, entitled, "Method for Determining the Fundamental Frequency of a Voice Signal" by H. Katterfeldt et al. The system of that patent uses two shift registers, each providing different time delays to an input signal for providing inputs to a coincidence circuit. The output from the coincidence circuit drives a counter to provide correlation coefficients which identify speech fundamental frequencies.

Additional patents of interest are U.S. Pat. No. 4,227,175, entitled "Data Recognition Apparatus" by E. L. Newman, and U.S. Pat. No. 4,015,088, entitled "Real-Time Speech Analyzer" by V. V. Dubnowski, et al.

A publication of interest is: R. F. Purton, Speech Recognition Using Autocorrelation Analysis (June 1968), IEEE Transactions on Audio and Electracoustics, Vol. AV-16, No. 2, pp. 235–239.

SUMMARY OF THE INVENTION

According to the present invention there is provided an autocorrelation processor for processing speech signals wherein a clipper is adapted to receive an electrical signal equivalent of a speech segment for clipping the electrical signal at amplitudes above selected thresholds to provide a clipped signal. A sample and holding device coupled to the clipper receives the clipped signal and samples the clipped signal, at a periodic rate, to convert the clipped signal into a bit (digital) stream which is held for a predetermined number of consecutive bits. A first register is coupled to the sample and holding device for receiving and holding a first occurring predetermined number of consecutive bits. A second register is coupled to the sample and holding device for receiving and holding a second occurring predetermined number of consecutive bits. A correlation device operatively coupled to the first and the second register outputs logically combines each of the first occurring predetermined number of consecutive bits with corresponding ones of the second occurring predetermined number of consecutive bits in an autocorrelation process to provide a frame of autocorrelated bits. A third register is provided for receiving the autocorrelated bits from the correlation device. A counting device, coupled to the third register, counts the number of bits of one binary value contained in a frame of bits to form autocorrelation coefficients. A memory which is coupled to the counting device receives and stores the autocorrelation coefficients.

From the foregoing it can be seen that it is a primary object of the present invention to provide an improved system for converting speech signals into compact storable digital signals.

It is a further object of the present invention to provide an improved system for autocorrelating input speech segments.

It is yet a further object of the present invention to provide a system wherein coefficients of known sampled speech signals are stored for later comparison with unknown speech signals for the purpose of identifying the unknown speech signals.

These and other objects of the present invention will become more apparent when taken in conjunction with the following description and drawings wherein like characters indicate like parts and which drawings form a part of the present specification.

BRIEF DESCRIPTION OF THE DRAWINGS

FIG. 2 is a map of the correct positioning of FIGS. 2A, 2B, and 2C;

FIGS. 2A, 2B and 2C illustrate, in schematic form, the current samples, previous samples and holding registers of FIG. 1;

FIGS. 11A and 11B illustrate in Table form the programming used for the circuitry of FIGS. 10A and 10B;

DESCRIPTION OF THE PREFERRED EMBODIMENT

Figure 1:
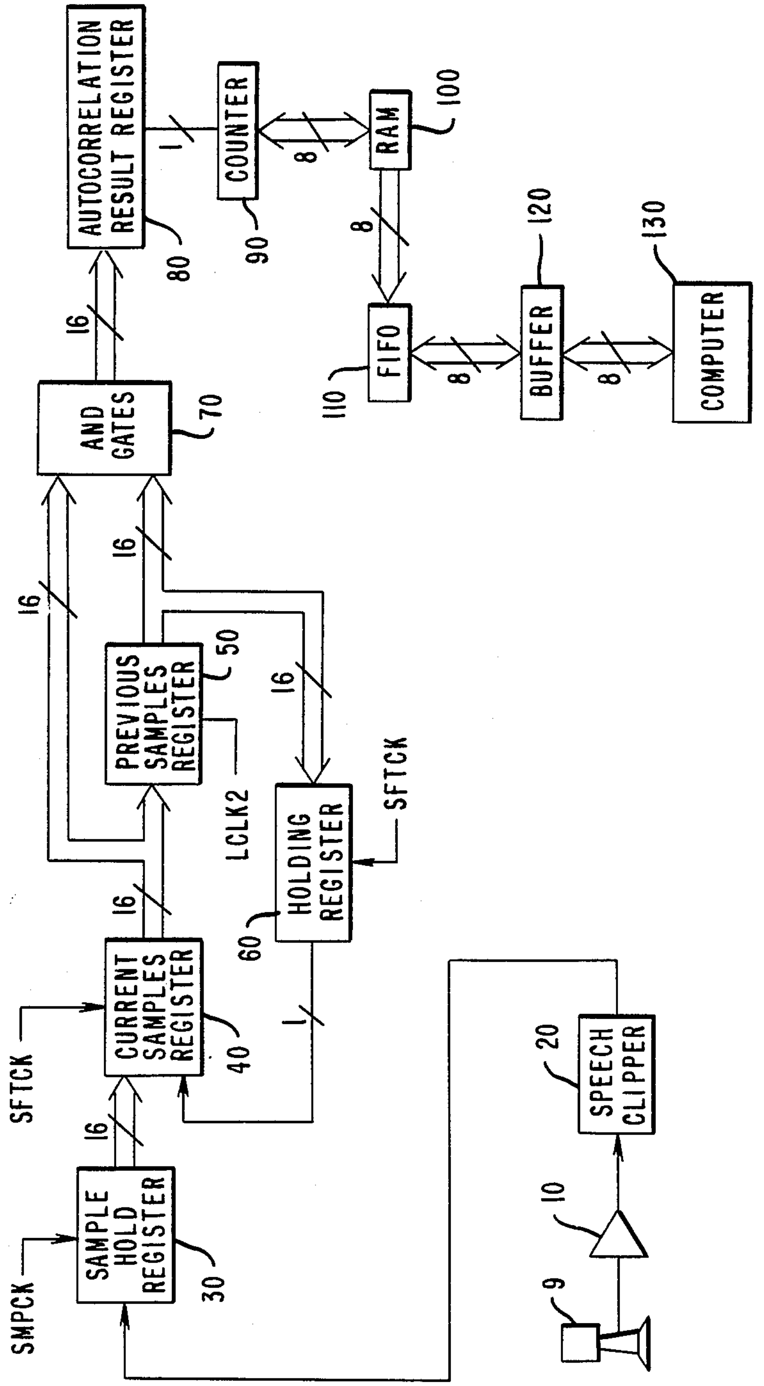
FIG. 1 is a simplified block diagram of the preferred embodiment of the invention.
Figure 3:
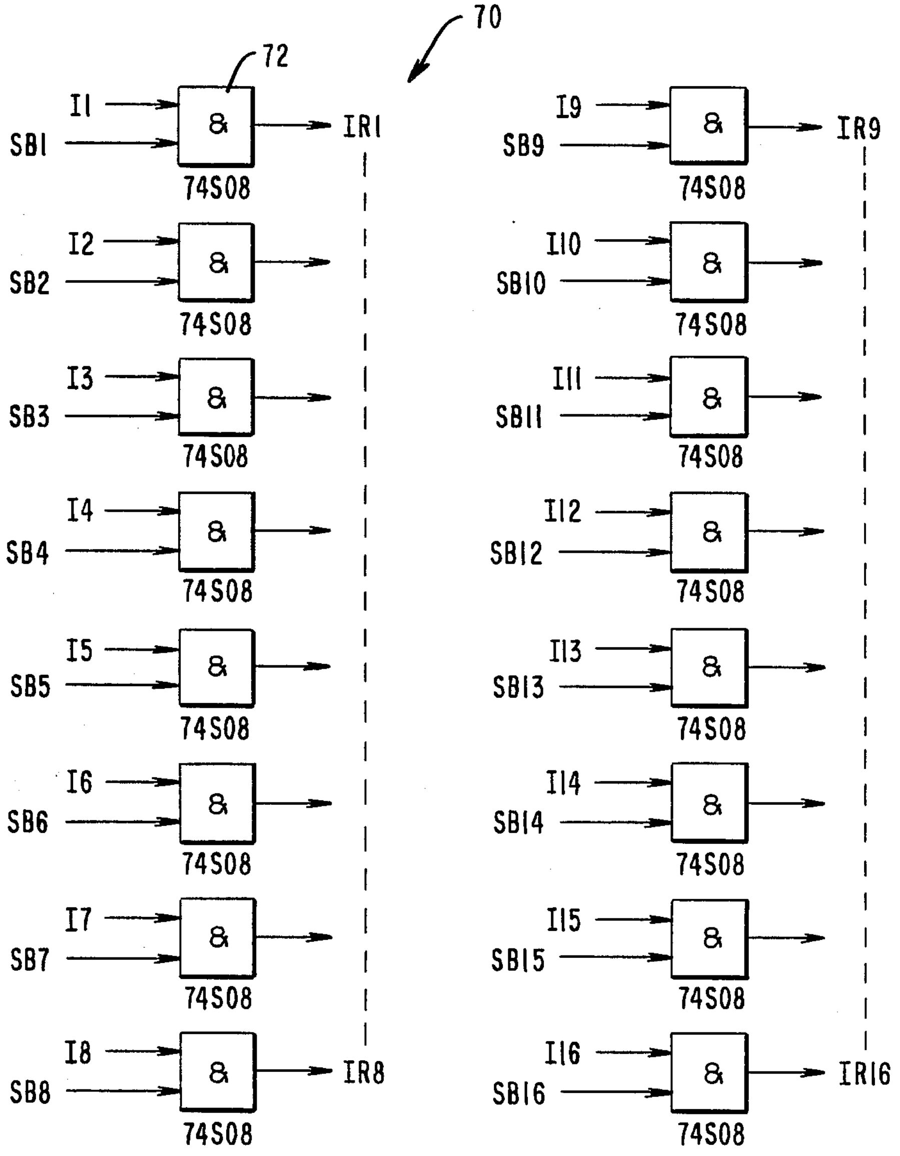
FIG. 3 illustrates a matrix of logic gates used in the embodiment of FIG. 1.

Referring to FIG. 1, a microphone 9 is used to convert a speech signal into an analog electrical signal which signal is directed to an amplifier 10. Amplifier 10 provides gain to the analog signal and directs the amplified signal to a speech clipper 20. In operation, the speech clipper 20, which preferably is an infinite clipper, limits the amplitude excursions of the analog signals while simultaneously squaring up the slope of the analog signal to form a digital signal. The digital signal is then directed to a sample and hold register 30 where it is sampled and held at a 25 KHZ rate under control of the sample clock signal SMPCK to thereby provide a binary signal conversion of the original speech signal. When 16 samples are held in register 30 they are clocked out to a current samples register 40. The next group of 16 samples is directed to the current samples register 40 to become the current samples and the previous 16 samples are directed to a previous samples register 50. Under control of a shift clock signal SFTCK and the clocking signal LCLK2 the samples from the current samples register 40 and the previous samples register 50 are directed to the inputs of an AND gate matrix 70 (See FIG. 3) such that the previous 16 samples and the current 16 samples are binary multiplied (1 bit in width) 16 bits at a time by the AND gates 70. Each pulse of the shift clock signal SFTCK causes the production of 16 results, with the results being directed to an autocorrelation result register 80. The bits from the previous samples register 50 are also directed to a holding register 60. The holding register 60 converts the parallel 16 bits, received on its inputs, into a serial bit stream which is inputted to the current samples register 40 to serially shift the bits received by the current samples register 40. An eight bit counter 90 is connected to receive the output of the autocorrelation result register 80 and to interface with a 256×8 RAM 100. The counter 90, in conjunction with the RAM 100, performs an autocorrelation accumulation.

In operation, the cumulative results stored in RAM 100 are read out and incremented with the autocorrelation results in counter 90 and the incremented results are stored back in RAM 100. When 256 sixteen bit frames of autocorrelation calculations are accumulated in the RAM 100 they are presented to a first-in, first-out (FIFO) storage register 110. In the preferred embodiment of the invention, the signals stored in register 110 may be further utilized by a computer 130. If such is the case, a buffer 120 provides buffer control to control the signals from and to the computer to properly interface with the register 110. If the computer 130 is dedicated to the present system then the register 110 and the buffer 120 can be eliminated and the output from the RAM 100 can be directed, as a direct input, to the computer 130.

Figure 2A:
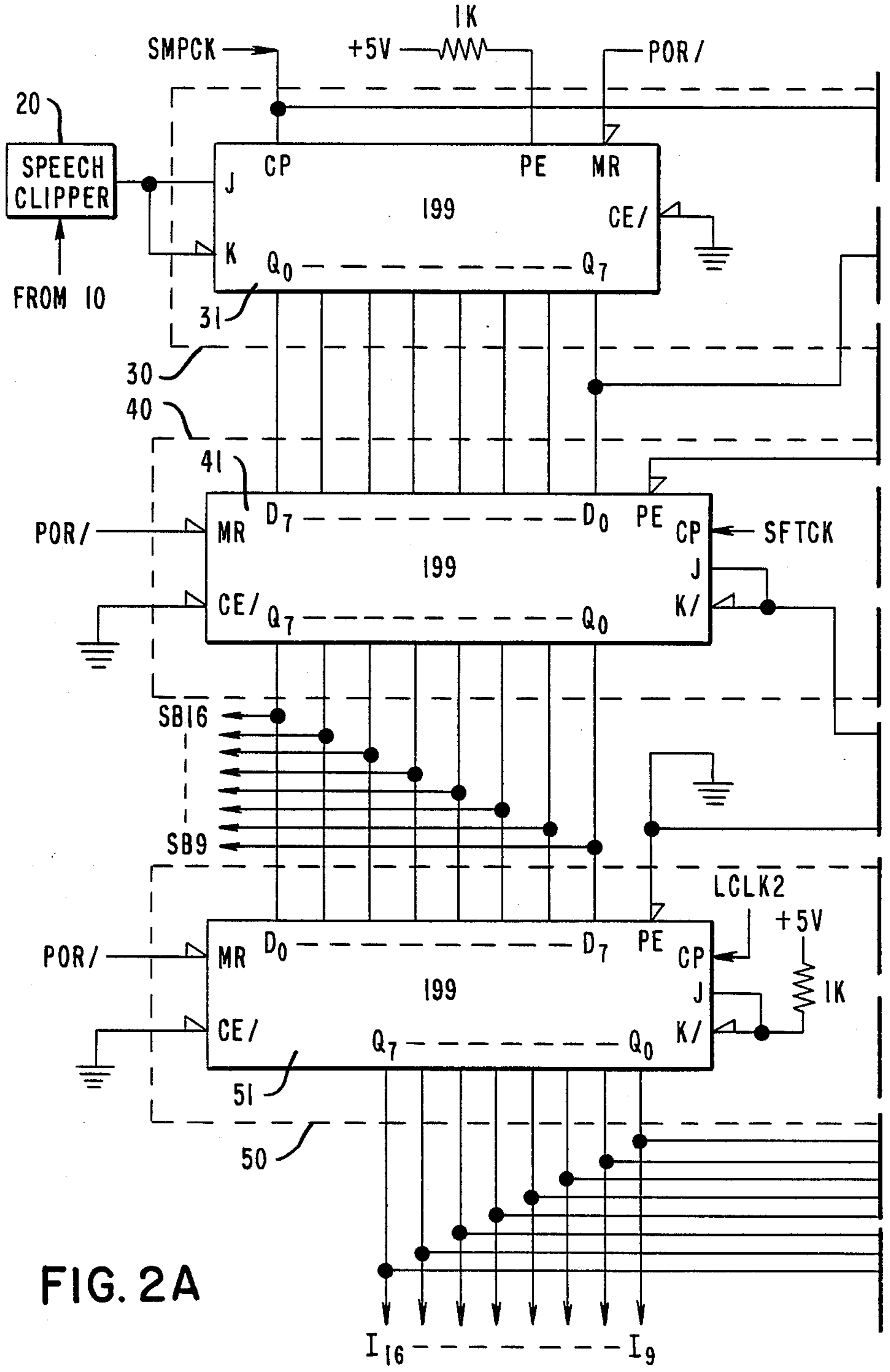
Figure 2B:
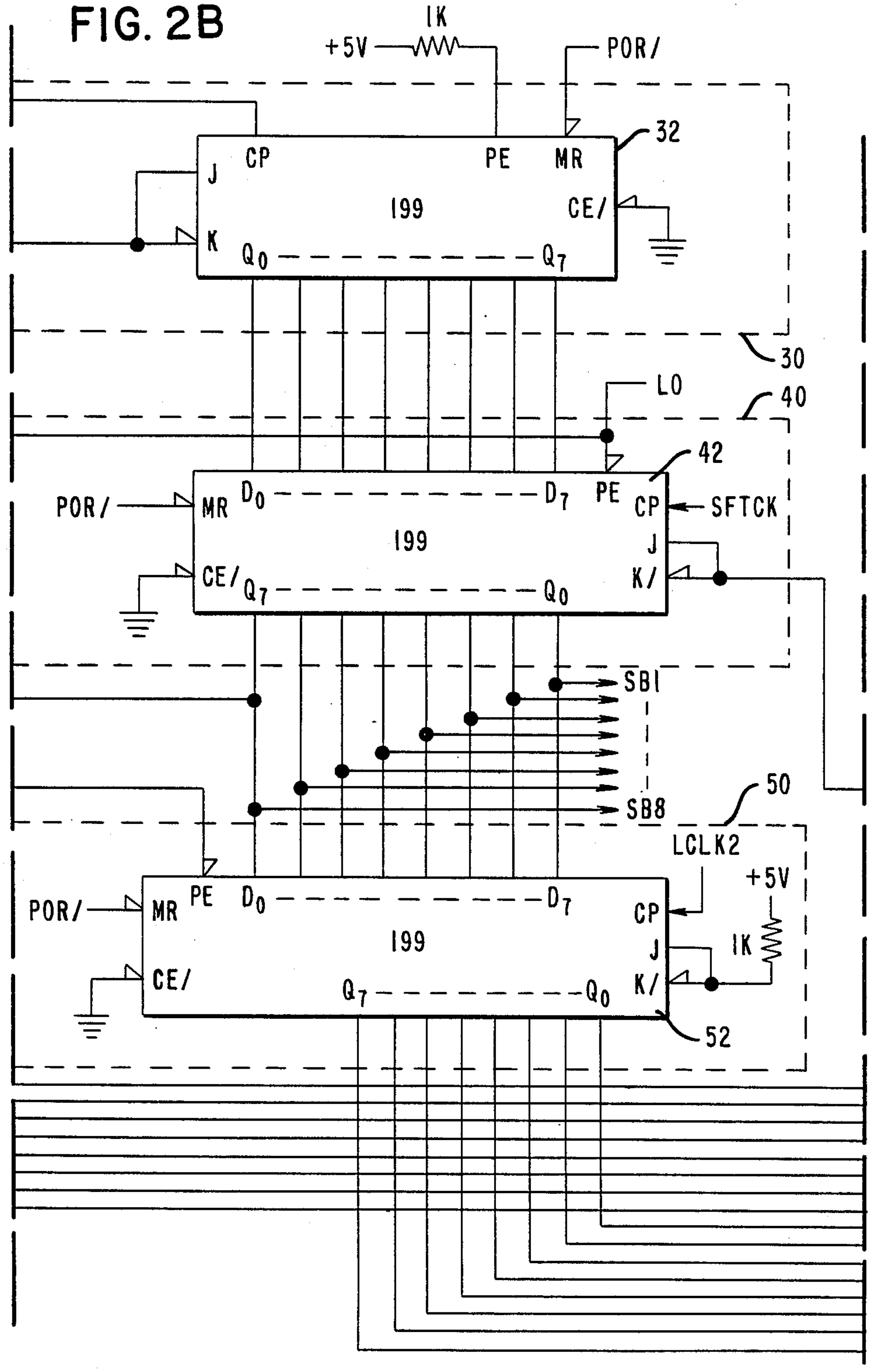
Figure 7:
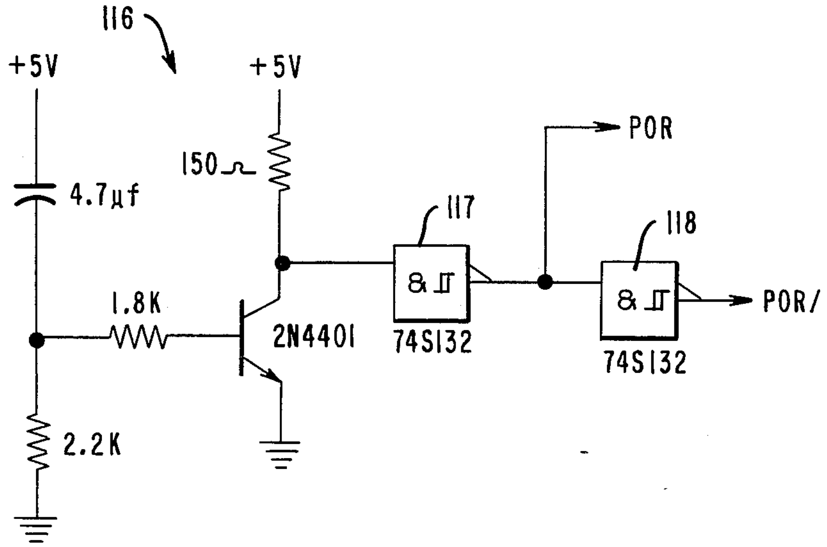
FIG. 7 illustrates a circuit for generating certain signals used with the preferred embodiment of FIG. 1.

Referring now to FIGS. 2A, 2B, and 2C, assembled according to the map of FIG. 2, the output of the speech clipper 20, which is digital in form, is directed to the JK inputs of an eight bit, serial-in parallel-out, shift register 31. The eighth output of shift register 31, labeled $Q_7$, is coupled to the JK input of an identical shift register 32 so as to form a sixteen bit, serial-in, parallel-out, shift register corresponding to the samples holding register 30 of FIG. 1. The parallel output bits from shift register 31 are directed to corresponding inputs of a, parallel-in, parallel-out, shift register 41 which shift register, also in response to signals on its JK input, serially shifts the parallel inputs at a rate determined by the transition of the signal on the CP input. In a like manner, the parallel-in, parallel-out, shift register 42 receives the parallel outputs of the shift register 32. Shift registers 41 and 42 form the current samples register 40, shown in FIG. 1. The sixteen output signals from registers 41 and 42 are labeled SB1–SB16 and are connectable to one like labeled input of a respective AND gate 72, shown in FIG. 3. In addition, the outputs of registers 41 and 42 are directed to the inputs of registers 51 and 52 respectively. These two registers form the previous samples register 50, shown in FIG. 1. In the preferred embodiment, these registers are, parallel-in, parallel-out, registers which are under the control of the clocking signal LCLK2. The outputs from these registers are labeled $I_1$ through $I_{16}$, each of which corresponds to a preceding sample, and which is directed to a like labeled input of a corresponding AND gate 72, shown in FIG. 3. Additionally, the outputs from register 51 are also directed to the D labeled inputs of a holding register 61. The outputs from register 52 are directed to the D labeled inputs of a holding register 62. The holding register 62 has its JK inputs connected to ground and its last output stage, labeled D7, connected to the JK inputs of register 61. The bits appearing at input terminal $D_0$ are stepped through shift register 62 in a leftwards direction, flowing into shift register 61, through shift register 61, and out terminal $D_7$ to the JK inputs of the parallel-in, parallel-out, serial shift register 42. The last output stage of shift register 42 is designated Q7 and is connected to the JK inputs of the shift register 41 so as to cause a serial shifting of the bits appearing on the parallel inputs labeled D0–D7. The input bits are shifted at a rate determined by the rate of the signal appearing on the CP input. The serially shifted bits appear on the outputs labeled $Q_0$–$Q_7$. A signal POR/, generated by the circuit shown in FIG. 7, is applied to the reset inputs, labeled MR, of registers 31, 32, 41, 42, 51, and 52 to clear the registers to an initial condition upon system power up. The signal LCLK2 which is applied to the CP labeled inputs to registers 51 and 52 is derived from the chip 284, shown in FIG. 10B.

Figure 8A:
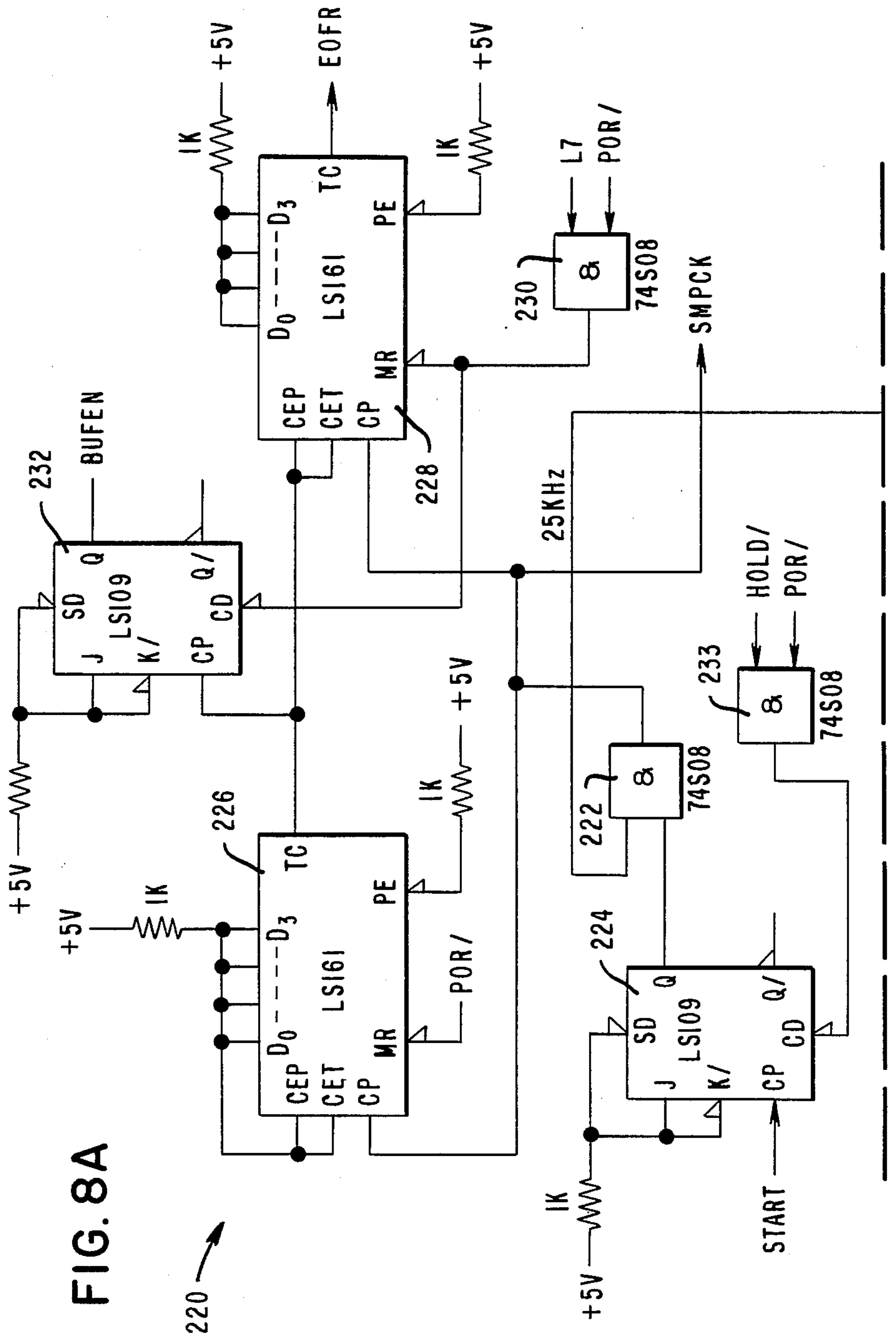
FIGS. 8A and 8B illustrate in block schematic form circuits for generating clock and other signals used with the preferred embodiment of FIG. 1.

In operation, the clipped speech signal, appearing at the JK inputs of the shift register 31, are sampled at a rate determined by the clock signal SMPCK appearing at the CP input. The clock signal SMPCK is derived from a portion of the circuitry shown in FIG. 8A. When sixteen samples have been loaded into the registers 31 and 32 combined they are distributed to the inputs of registers 41 and 42. A shift clock signal SFTCK is applied to the CP inputs of shift registers 41, 42, 61 and 62. The shift clock signal, which is generated by a portion of the circuitry shown in FIG. 9, clocks the sampled bit signals into registers 41 and 42. The AND gate network 70 of FIG. 3, receives the SB labeled inputs, corresponding to current samples, and the I labeled inputs, corresponding to previous samples and performs a binary multiply (1 bit in width), between the previous sixteen samples and the current sixteen samples to provide a product which is labeled IRx where the letter x identifies the particular sample, 1–16. Equation 1 illustrates the results obtained:

$$IRx = Ix.SBx \quad (1)$$

where: x equals the bit position or shift interval; Ix is a previous group of speech samples; and SBx is the current group of speech samples. Each shift clock pulse SFTCK produces sixteen results, IR1 through IR16. The registers may be 74199 8 bit bidirectional universal shift registers of the type manufactured by NATIONAL SEMICONDUCTOR CORPORATION.

Figure 4:
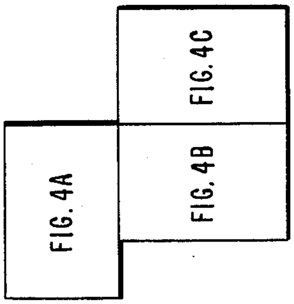
FIG. 4 is a map of the correct positioning of FIGS. 4A, 4B, and 4C.
Figure 4A:
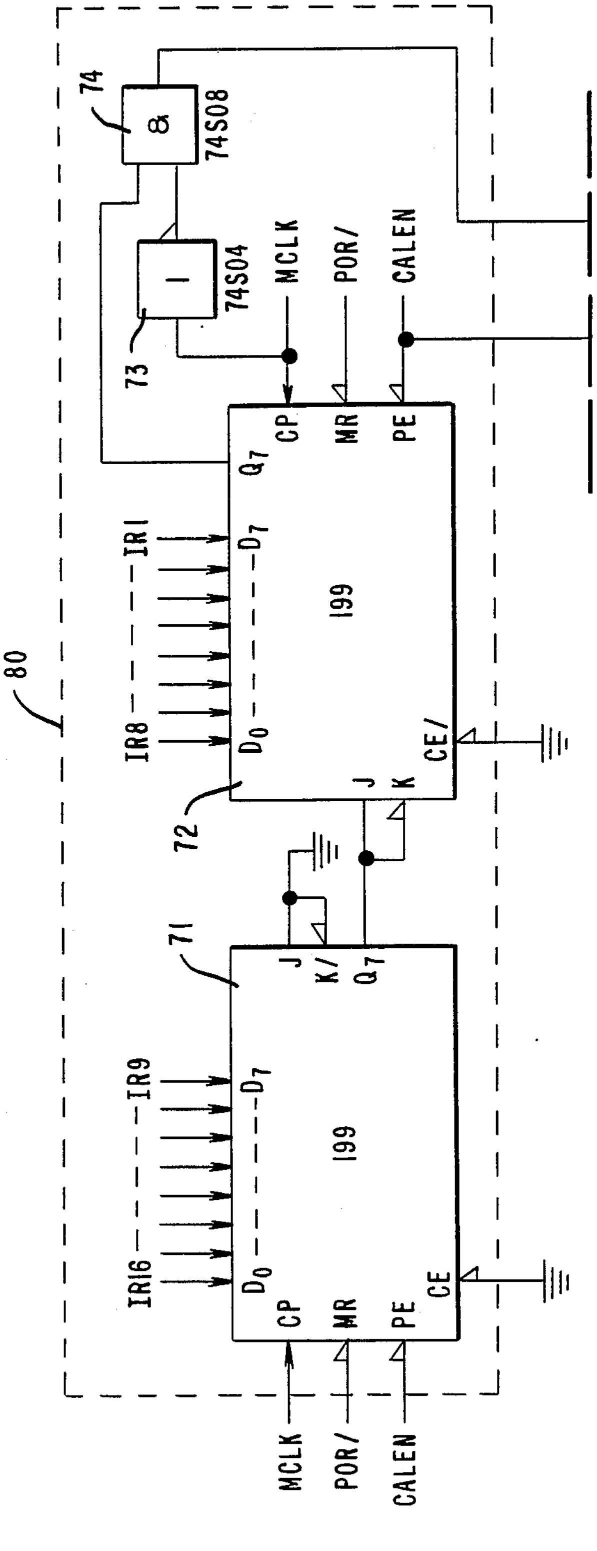
FIGS. 4A, 4B and 4C, illustrate, in schematic form, the autocorrelation result register, counter and RAM of FIG. 1.
Figure 4B:
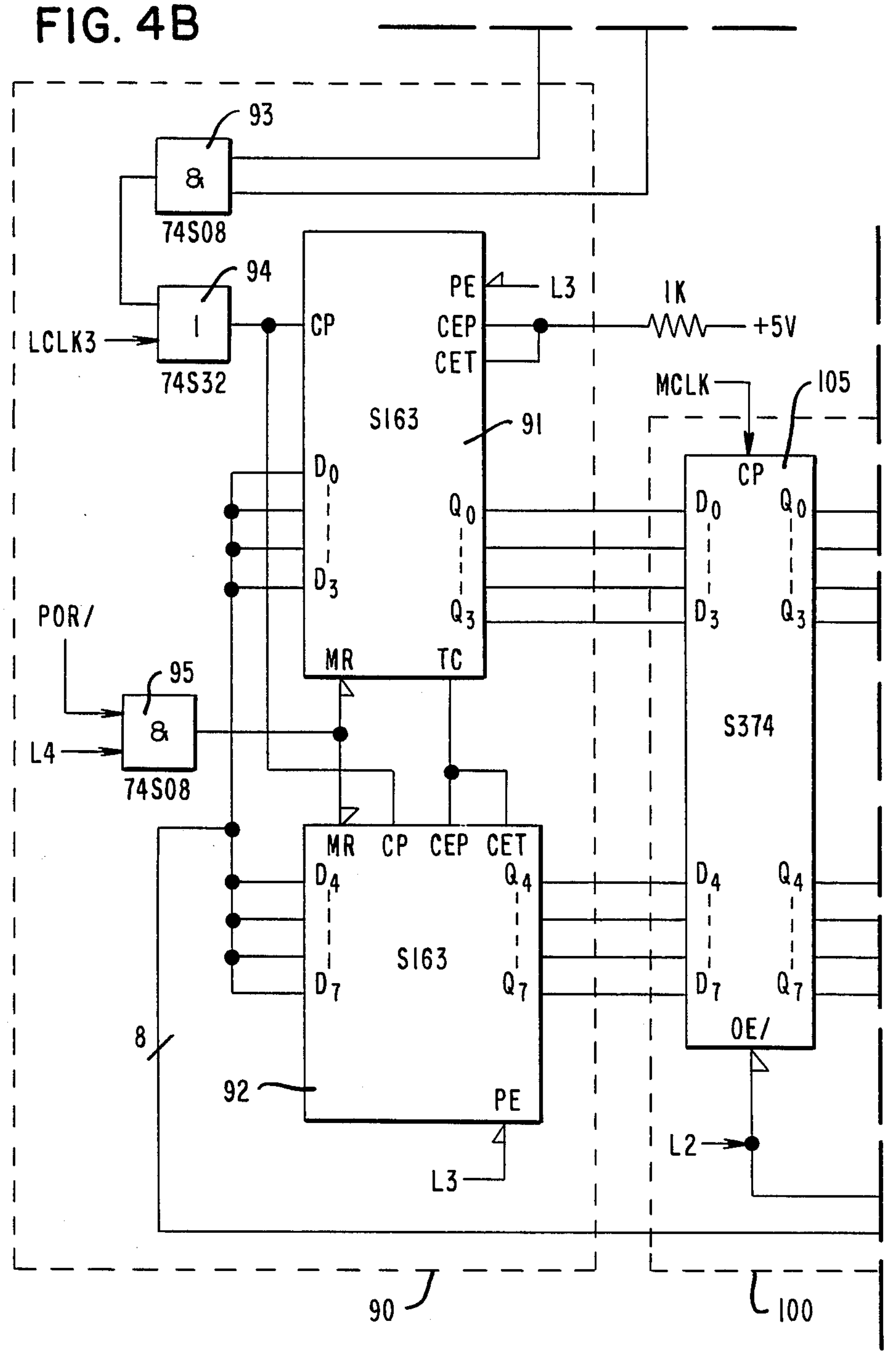
Figure 4C:
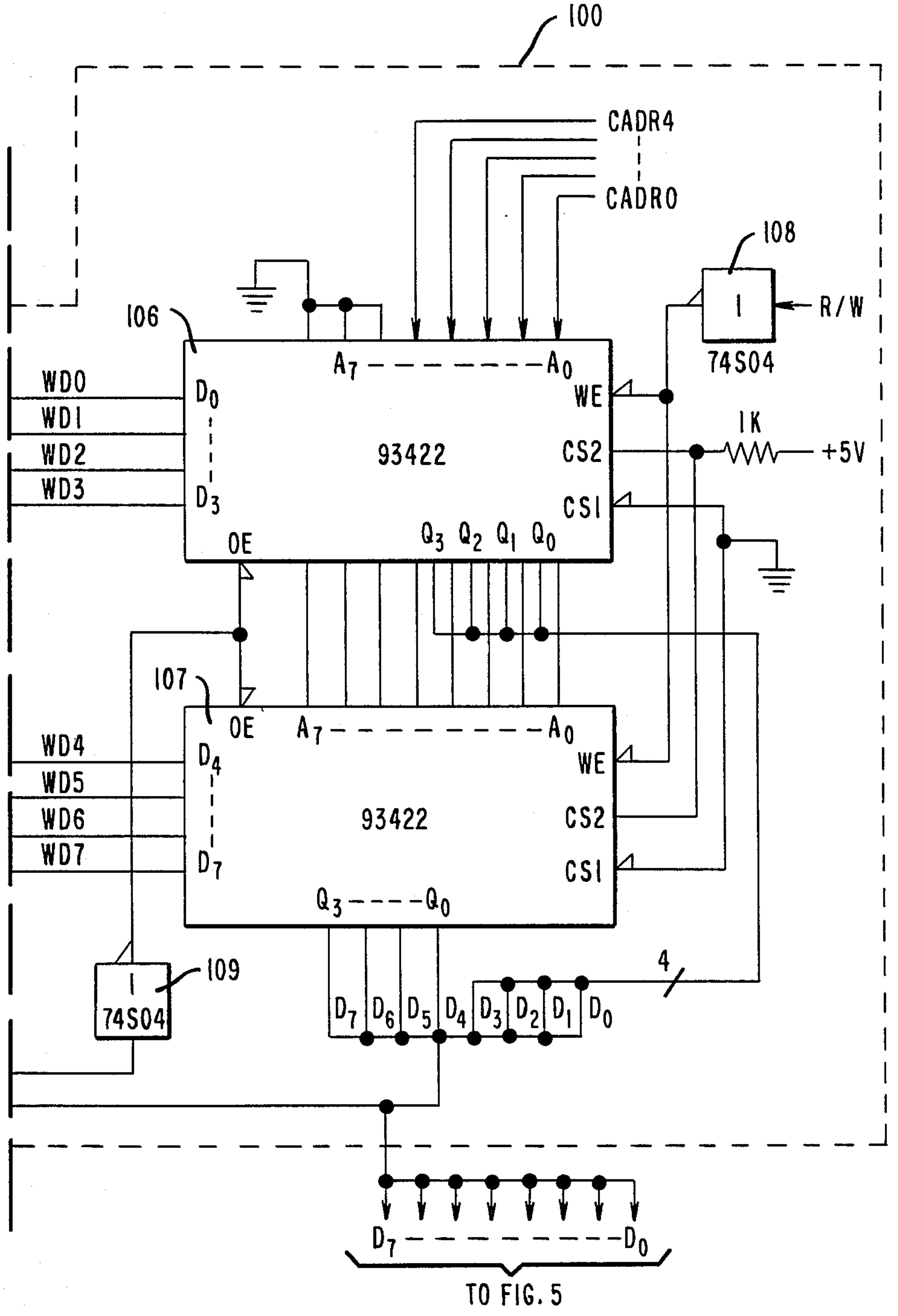

Referring now to FIGS. 4A, 4B and 4C assembled according to the map of FIG. 4, the autocorrelation result register 80 is shown comprised of, two parallel-in, serial-out, shift registers 71 and 72, connected in tandem, such that the output of the shift register 71 is connected to the JK input of the shift register 72. The binary multiplied outputs (IR1 through IR16) are directed, in groups of eight, to the D7 through D0 labeled inputs of shift registers 72 and 71, respectively. The serial output, from register 72, is taken from the output labeled Q7 and is directed through gate 74 to the input of counter 90 under the control of an inverted clocking signal MCLK appearing at the output of inverter 73. Within the counter 90, gate 93, under control of a signal CALEN, gates the signal from gate 74 to an input of an OR gate 94. The CALEN signal is generated by a portion of the circuitry shown in FIG. 10B. The OR gate 94 receives as a gating signal the signal LCLK3. The gated output signal from the OR gate 94, is applied to the input labeled CP of a counter 91 and a like labeled input of a counter 92. Counters 91 and 92 are 4-bit counters which interface with the RAM unit 100 to provide to the RAM a count accumulated signal which accumulated signal may then be withdrawn from the RAM and upgraded within the counter 90 with a new count signal coming from the autocorrelation result register 80. This upgrading continues within each frame of counts but ends at the last count for a frame. The 4-bit outputs from counter 91 and counter 92 are directed to inputs, labeled D0–D7, of a buffer (latch) 105. The outputs of buffer 105, labeled Q0–Q3, are directed as data inputs to an addressable RAM section 106. The outputs labeled Q4–Q7 are directed as data inputs to a RAM section 107. The RAM 100 is addressed by the signals CADRO-CADR4, appearing on the inputs labeled A0–A4 on RAM unit 106. A 4-bit output is taken from RAM unit 106 at the outputs labeled Q0–Q3. Those outputs are directed to the inputs labeled D0–D3 of counter 91 and to the corresponding inputs of the FIFO unit 110, shown in FIG. 5. Likewise, the outputs labeled Q0–Q3, from the RAM unit 107 are connected to the inputs labeled D4–D7 of the FIFO unit 110, shown in FIG. 5, and to the inputs labeled D4–D7 of counter 92. The 4 bits from the RAM unit 106 correspond to the lower order data bits D0–D3. The 4 bits from the RAM unit 107 correspond to the higher order data bits D4–D7.

An AND gate 95 receives as inputs the signals POR/ and L4. The L4 signal is generated with the circuit of FIG. 13. The signal at the output of AND gate 95 is directed to the reset terminals labeled MR of counters 91 and 92. An inverter 109 and the latch 105 receive the signal L2 from the circuit of FIG. 13 and pass the signal to the OE/ and OE labeled inputs of buffer 105 and RAM sections 106 and 107. When OE/ is LOW the data in the buffer 105 appears at the outputs; when OE/ is HIGH, the outputs are in a high impedence state-disconnected from the RAM inputs D0–D7. A read/write signal R/W, when appropriate, is applied to the RAM sections 106 and 107 at the WE labeled inputs Via, an inverter 108.

Figure 5:
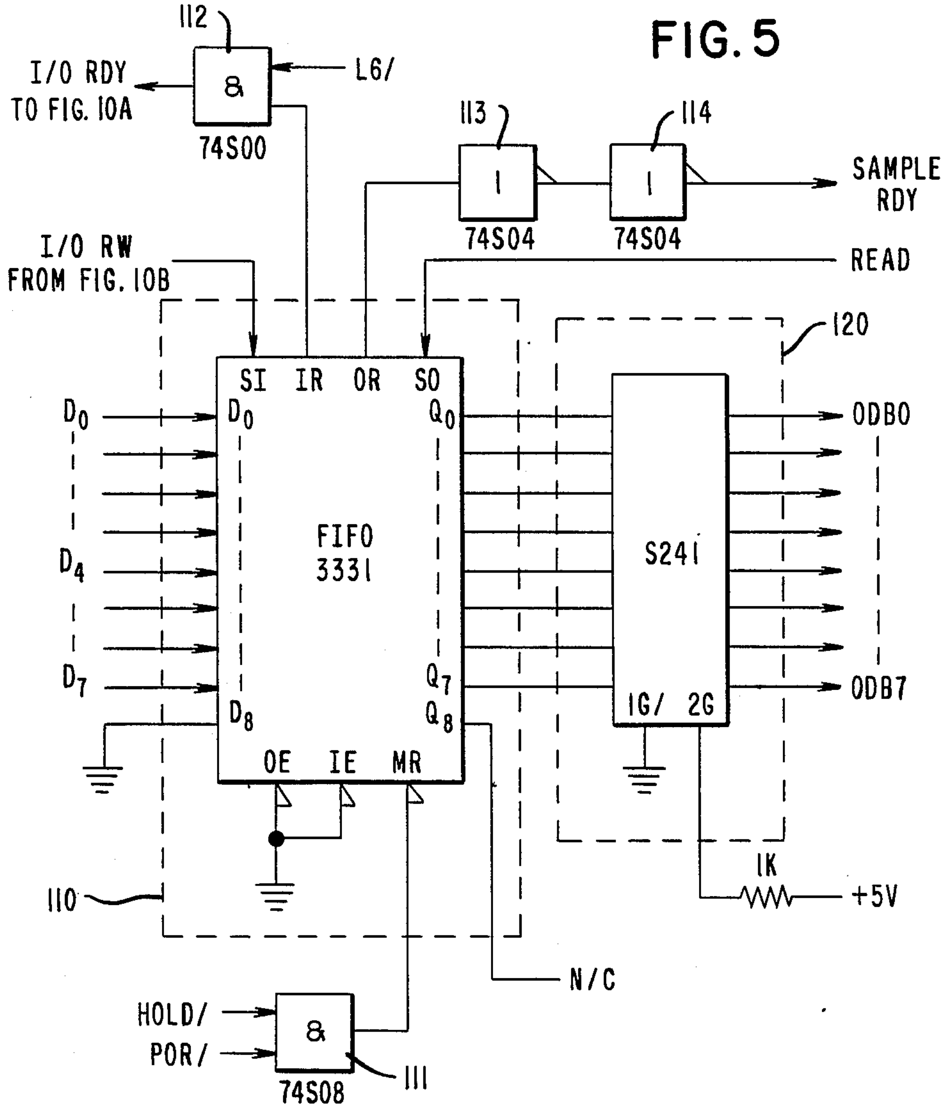
FIG. 5 illustrates, in schematic form, the FIFO register, and buffer of FIG. 1.

Referring now to FIG. 5, the FIFO register 110 receives the data inputs labeled D0–D7 and under control of the signals I/O/RW and I/O RDY, provides these signals on a first-in, first-out basis at its outputs labeled Q0–Q7, to the inputs of a buffer TRI-STATE bus driver 120. The buffer 120 provides at its outputs, the accumulated samples that are received in successive group frames of 16 members for each frame. These members correspond to the accumulated autocorrelation sums that have been stored in the RAM 100. The group members may be directed to a computer 130 for further processing, such as would be required to formulate a speech recognition system. An AND gate 111 receives the signals HOLD/ and POR/ and provides at its output a reset signal which is directed to the MR labeled input of the FIFO 110. The I/O RDY signal is gated from the FIFO by an AND gate 112 under control of the gating signal L6/. Two serially connected inverters 113 and 114 provide the SAMPLE ROY signal from the signal appearing at the OR labeled output of the FIFO. A READ signal, when appropriate, is applied to the FIFO input labeled SO.

In operation register 80, counter 90, FIFO 110, and RAM 100 are used to accumulate partial sums of an auto correlation calculation. Register 80 holds the value of a partial autocorrelation that is shifted out of register 80 serially. The number of "1" bits is counted by counter 90, thus summing up the partial autocorrelation. It should be noted that the counter could be preloaded with a previous partial sum. The previous partial sum would then be "added to " by incrementing the counter with the autocorrelation value contained in register 80. Register 105 provides a temporary holding of the partial sum which will be written into RAM 100 at the proper address as signified by CADRO–CADR4. After all partial sums of autocorrelation values are determined (they are now present in RAM 100), the final autocorrelation values are read from RAM 100 and presented to FIFO 110 via the data bus D0–D7 in the I/O READ/WRITE cycle of the firmware (address F thru 15).

Figure 6:
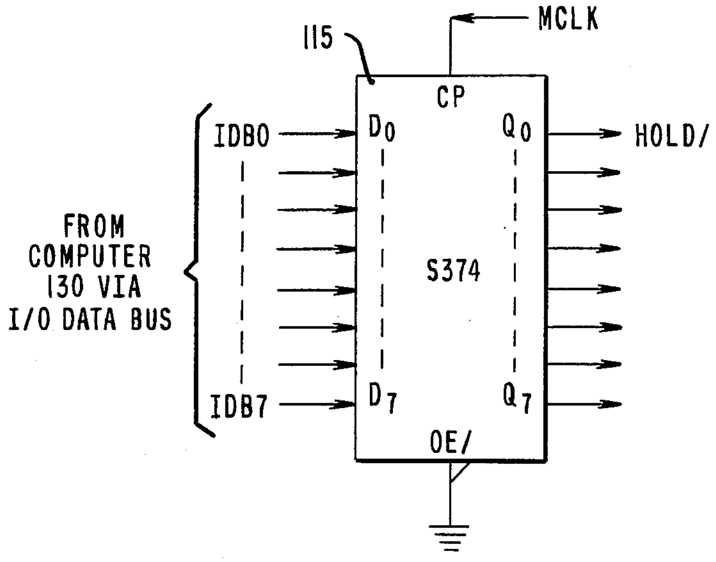
FIG. 6 illustrates an interfacing circuit which may be used with the preferred embodiment of FIG. 1.

Referring to FIG. 6, a buffer 115, is adapted to be connected to the I/O bus of the computer 130 to stop the binary autocorrelation processor when desired. This is achieved by using the bit IDBO to generate the signal HOLD/. The HOLD/ signal performs this function by being directed to the reset and start flip-flop 224, shown in FIG. 8A and to the MR labeled input of the FIFO 110, shown in FIG. 5.

Referring to FIG. 7 the circuit 116 provides a power on reset function by insuring that the signals POR and POR/ are not generated until a time t after the application of the +5 V to the circuit. The time t is approximately equal to 1/RC where R=2.2K and C=4.7 uf. Schmitt triggers 117 and 118 sense the voltage level on the cathode of the 2N4401 transistor and provide at their outputs the signals POR and POR/ respectively.

Figure 8B:
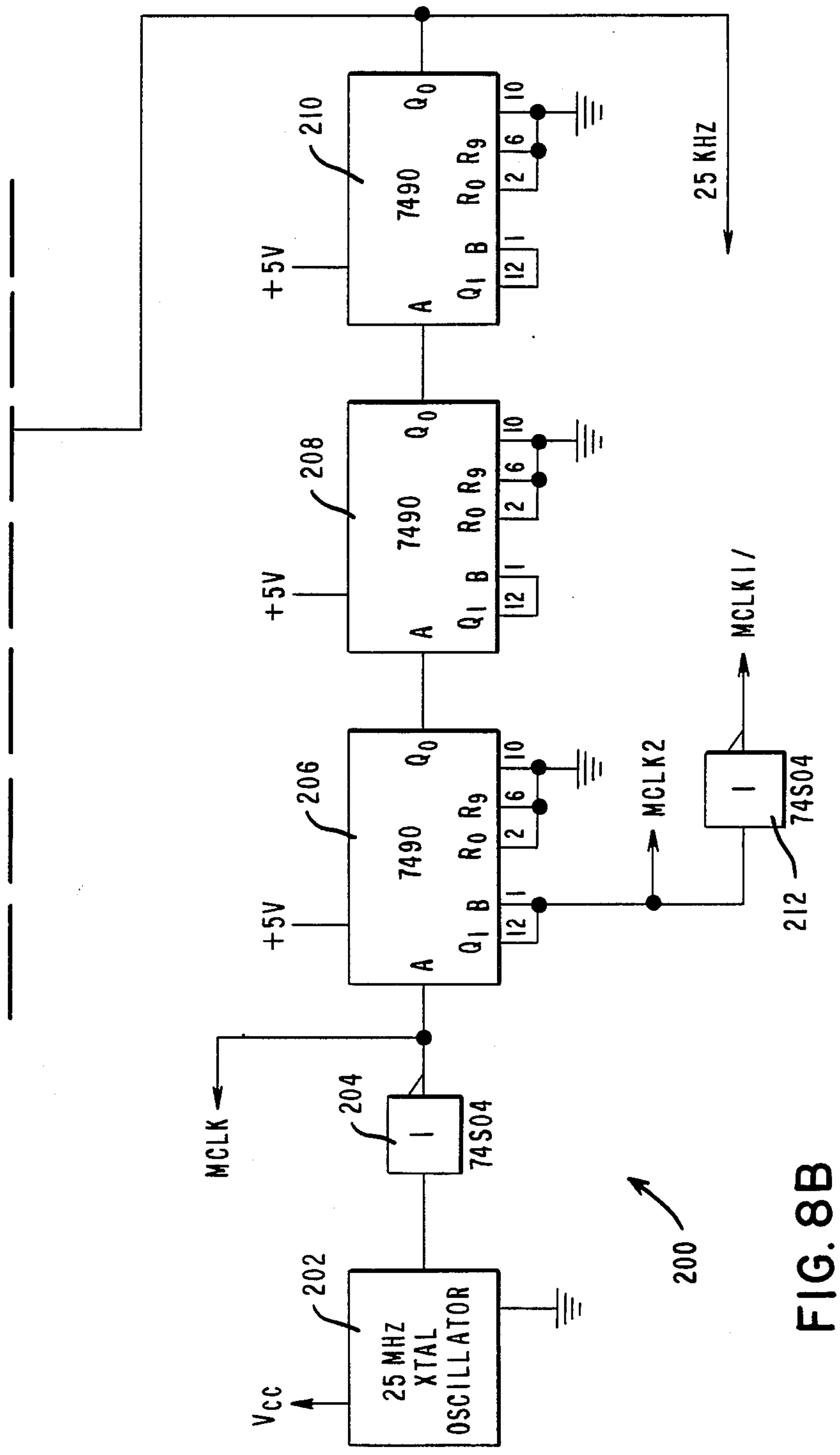

Referring now to FIG. 8, the 25 KHz. clock signal is derived from the clocking circuit 200. The clocking circuit is comprised of; a 25 MHz. crystal oscillator 202, for providing a 25 MHz sinusoidol signal, an inverter 204 which squares the sinusoidal signal from oscillator 202 into a digital signal, and a divider chain comprised of dividing circuits 206, 208, and 210. The output of the divider 210 is the 25 KHz. signal. The digital signal at the output of inverter 204 is the system master clock signal labeled MCLK. In the preferred embodiment of the invention, the divider 206 is a 7490 counter circuit with pins 12 and 1 connected together to provide an output MCLK2 to an inverter 212. The output of inverter 212 is the clocking signal MCLK1/. The 25 KHz. signal is directed to a frame counter 220 and more specifically, to an AND gate input 222. The enabling input to AND gate 222 is provided by the signal on the Q output of a JK flip-flop 224 which enables gate 222 upon the occurrence of a START signal appearing at the input labeled CP. The gate 222 may be disabled by applying either the HOLD/ signal or the signal POR/ to an AND gate 223. The output signal from the AND gate 222 corresponds to the sampling clock signal SMPCK. That signal is directed to the inputs of a pair of synchronous binary counters 226 and 228. In the preferred embodiment, the counters, 226 and 228, are 4-bit LS161 counters. The counter 226 is reset with the signal POR/ applied to the MR labeled input. The counter 228 is reset by the signal appearing at the output of an AND gate 230. The AND gate 230, at its inputs, receives the signal POR/ on one input and the gating signal L7 on its other input. The output signal from the AND gate 230 is also applied to the CD input of a JK flip-flop 232. Flip-flop 232 receives the output count signal from the counter 226 on its input labeled CP. The output signal from flip-flop 232 labeled BUFEN is taken from the terminal labeled Q. The output from counter 228 is taken from the carry output terminal labeled TC and is the signal EOFR. In operation, the counters 226 and 228 count units of sixteen bit frames until 256 sixteen bit frames are counted. When 256 counts are reached, the signal EOFR changes state.

Figure 9:
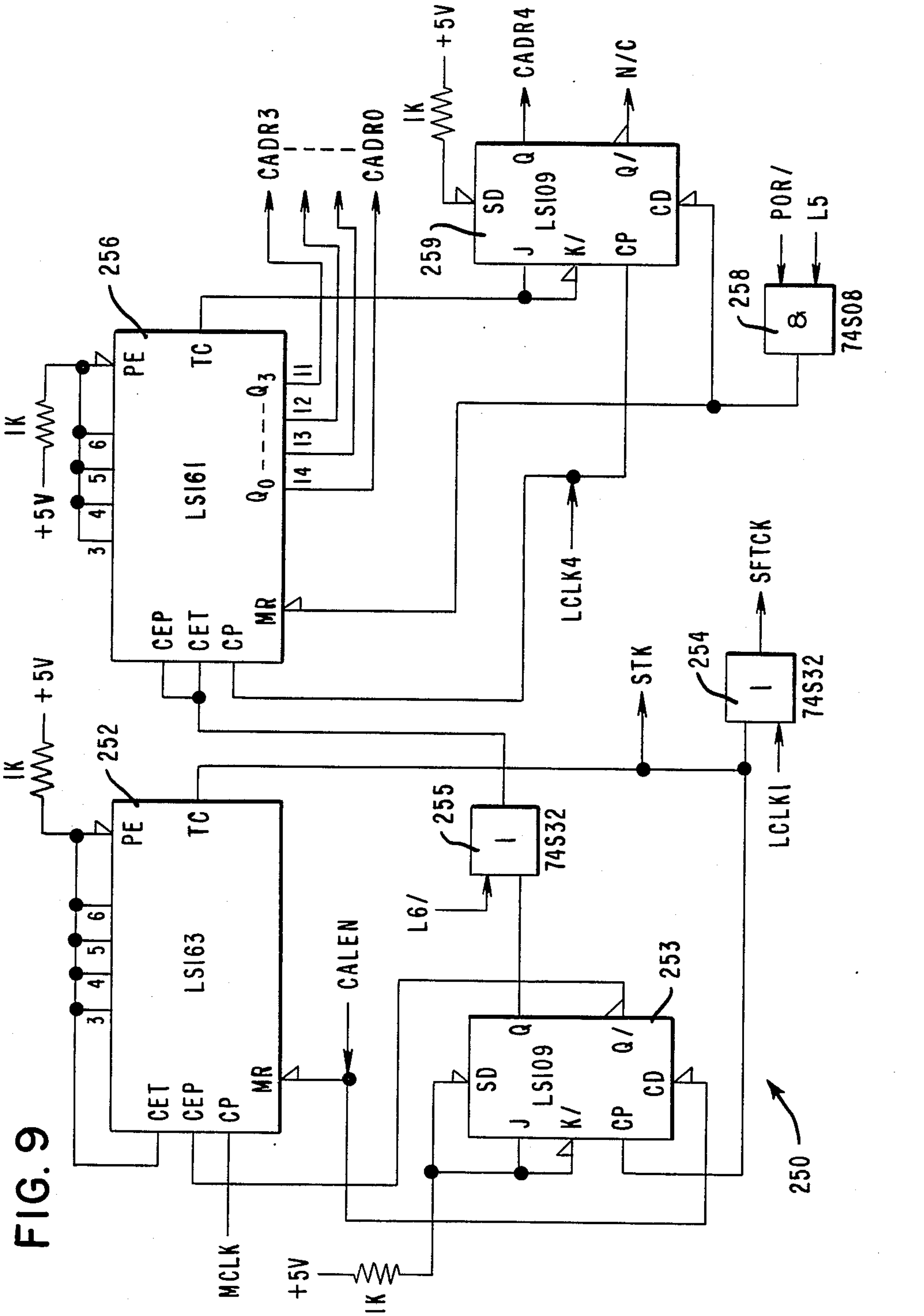
FIG. 9 illustrates in block schematic form a circuit for generating signals used with the preferred embodiment of FIG. 1.

Referring now to FIG. 9, a JK flip-flop 253 is set by the signal CALEN applied to its input labeled CP. The CALEN signal is also applied to the master reset input of a 4-bit synchronous counter 252. The counter 252 receives at its input, labeled GP, the signal MCLK. The counter clocks the MCLK signal and provides at its output a clocking signal STK. That signal is also applied to the C labeled input of the JK flip-flop 253 and to an input of an OR gate 254. The OR gate additionally receives at its other input the signal labeled LCLK1. The output from the OR gate 254 is the signal SFTCK. The signal present at the Q output of flip-flop 253 is directed as an input to an OR gate 255. The OR 255 gate additionally receives the signal L6/. The output of the OR gate 255 is directed to the CEP and CET labeled inputs of a synchronous binary counter 256. The terminal count of the counter 256 is directed to the JK inputs of a flip-flop 259 which flip-flop receives as its clocking signal, on the input labeled C, the signal LCLK4. That signal is also directed to the input labeled CP of the counter 256. An AND gate 258 receiving as its inputs the signal POR/ and the signal L5 and provides at its output a master reset signal to the CD labeled input of flip-flop 259 and the MR labeled input, of counter 256. The signal at the Q labeled output of flip-flop 259 is the signal CADR4. The counter 256 provides at its Q0–Q3 outputs the signals CADR0–CADR3, respectively.

Figure 10A:
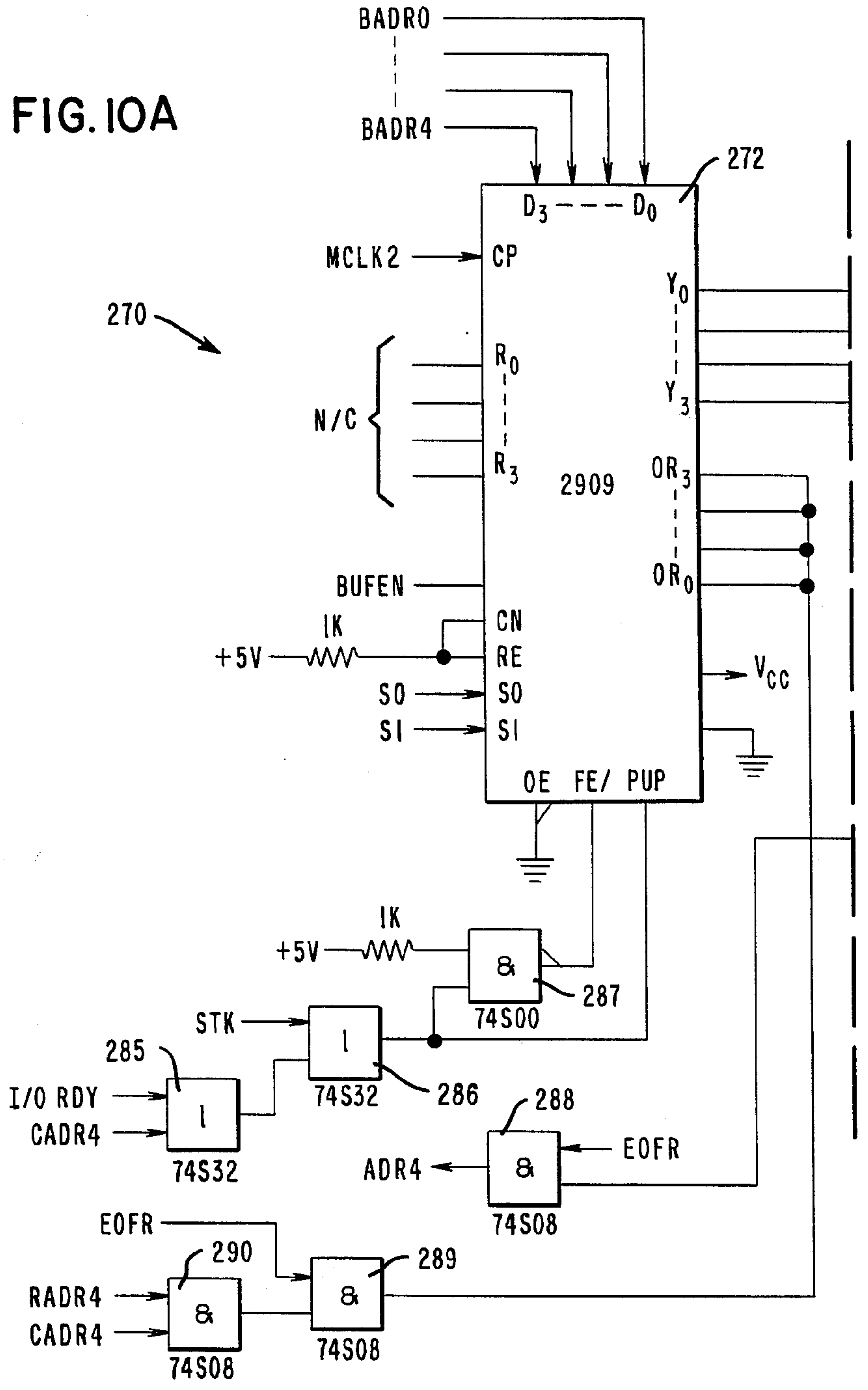
FIGS. 10A and 10B illustrate in block schematic form a circuit for providing control signals that are used in the preferred embodiment.
Figure 10B:
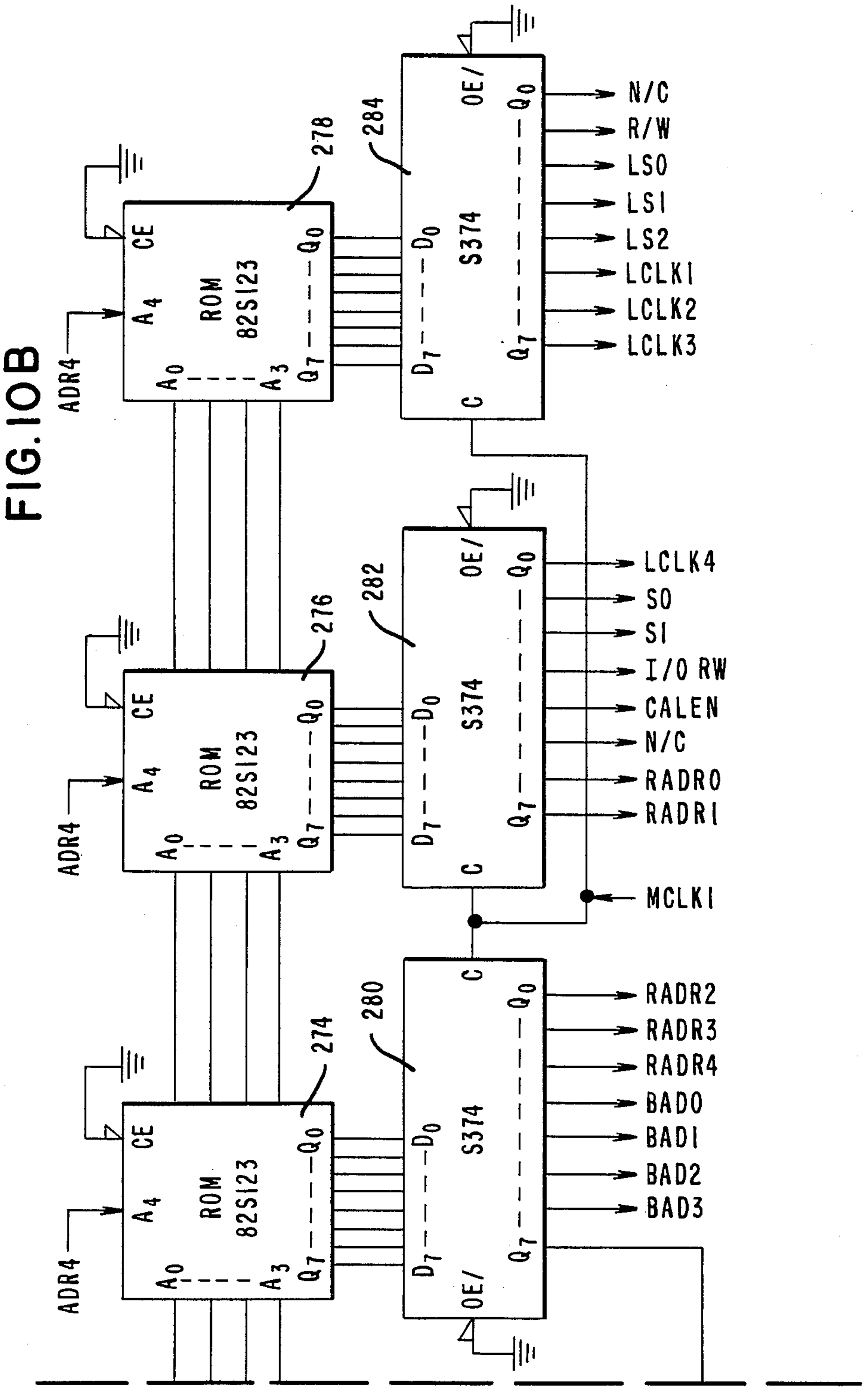

Referring now to FIG. 10, the control circuitry 270 is shown comprised of a number of elements for causing the automatic operation of the overall system. A microprogram sequencer 272 receives, as data inputs, on the terminals labeled D0–D3, the signals BADR0, BADR1, BADR2 and BADR3, respectively. Sequencing control is accomplished through the gating circuits 285, 286 and 287, wherein 285 is an OR gate having as its inputs the signals I/O RDY and CADR4. The outputs from OR gate 85 is directed to an input of an OR gate 286, which OR gate also receives as an input the signal STK. The output signal from OR gate 286 is directed to the sequencer input labeled PUP and to an input of a NOR gate 287. The other input of NOR gate 287 is a constant +5 volts, current limited by a 1K resistor. The output of the NOR gate 287 is directed to the sequencer input terminal labeled FE/. An AND gate 289 receives as an input the signal EOFR, which signal is gated to its output under control of the signal from an AND gate 290. The AND gate 290 receives as its inputs the signals CADR4 and RADR4. The output signal from AND gate 289 is directed to the input terminals labeled OP-0–OP3 of the microprogram sequencer 272. The microprogram sequencer outputs, labeled Y0–Y3 are directed as address inputs A0–A3, respectively to a ROM circuit 274. The ROM circuits 274, 276 and 278 comprise the firmware store for the system of the present invention. FIG. 11 is a table indicating the programming for the ROMs. The data output lines, Q0–Q7, of ROM 274 are directed to the data input terminals, D0–D7, of an 8-bit latch 280. The latch 280 is comprised of eight D-type flip-flops (not shown) which on the positive transition of a clock signal, appearing on its C input, causes the Q output to be set to the logic states that were set up at the D inputs. Two additional, 8-bit latches, 282 and 284, are provided for ROMs 276 and 278, respectively. The clocking signal MCLK1/ is directed to the clocking terminal labeled C of each of the latches 280, 282, and 284. The outputs from the latches 280 and 282 are directed to the inputs of a branch address circuit 300 shown in FIG. 12. The outputs from the latch 284 are directed as inputs to the register select circuit shown in FIG. 13.

Figure 12:
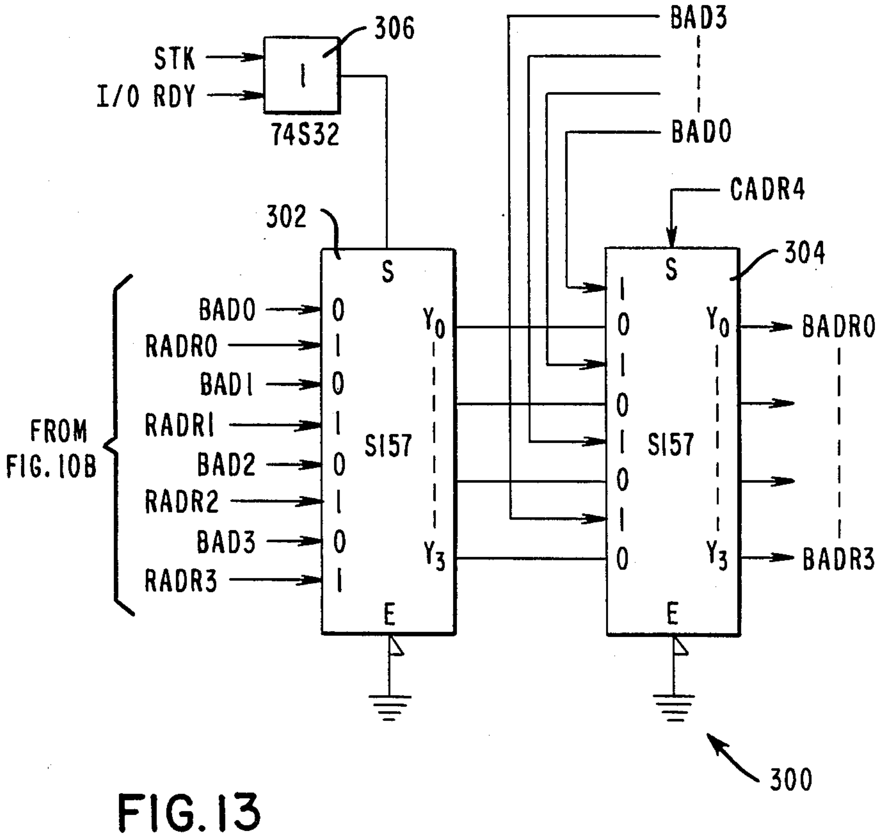
FIG. 12 is a schematic of a multiplexer circuit used in the preferred embodiment.

Referring now to FIG. 12, the branch address circuit 300 is shown comprised of a 2:1 multiplexer 302 which multiplexes between the signals, RADR0–RADR3, and the signals, BAD0–BAD3, under control of the signal appearing at the output of an OR gate 306 which is applied to the S labeled input of the multiplexer 302. The input signals to the OR gate 306 are the signals STK and I/O RDY. The multiplexed outputs, from multiplexer 302, appear at the output terminals labeled, Y0–Y3, and are directed to one set of inputs of a 2:1 multiplexer 304. Multiplexer 304 receives as another set of inputs the signals, BAD0–BAD3. Under control of the signal CADR4, applied to the S labeled input, multiplexer 304 multiplexes the signals on its inputs to the outputs labeled, Y0–Y3. The signals at these outputs are labeled, BAR0–BADR3. The output signals, BADR-0–BADR3, select the appropriate branch address signals to be applied to the microprogram sequencer 272, shown in FIG. 10.

Figure 13:
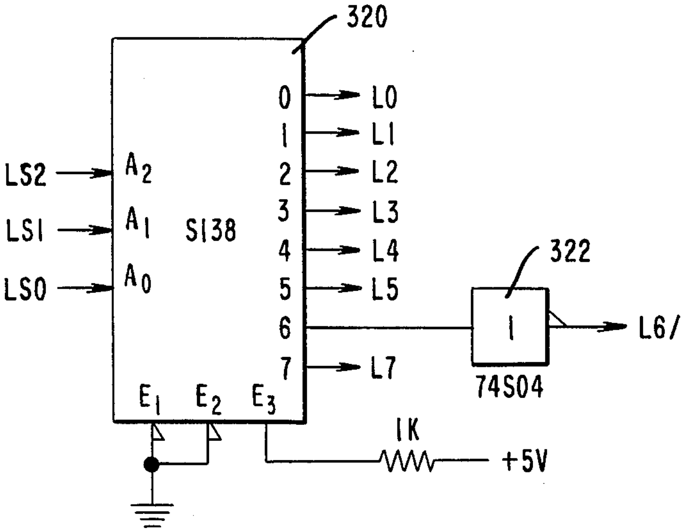
FIG. 13 is a schematic of a select register circuit used in the preferred embodiment.

Referring now to FIG. 13, the select register 320 is a 3 to 8 line decoder which is permanently enabled by the signals applied to the terminals labeled E1, E2 and E3. The inputs to the decoder are the signals LS0–LS2. The decoded outputs appear at the terminals labeled 0–7 correspond to the signals L0–L7. The signal L6 is inverted by the inverter 322 to provide the signal L6/.

The foregoing hardware description of the invention is in such detail that any person skilled in the art will be able to make the invention without undue experimentation. The use of the tables of FIGS. 11A and 11B will enable the programming of the ROM's of FIG. 10B and the duplication of applicants' results.

While there has been shown what is considered to be the preferred embodiment of the invention, it will be manifest that many changes and modifications may be made therein without departing from the essential spirit of the invention. It is intended, therefore, in the annexed claims, to cover all such changes and modifications as fall within the true scope of the invention.

I claim:

1. An autocorrelation processor for speech signals comprising:

converting means for converting a speech signal to a binary signal;

means for combining a first occurring portion of said binary signal with a second occurring portion of said binary signal in an autocorrelation process to form a frame of autocorrelated binary signals;

counting means coupled to said combining means for counting the number of binary signals of one binary value contained in a frame of autocorrelated binary signals to form autocorrelation coefficients from the sum of said binary signals produced by said counting means; and a memory coupled to said counting means for storing a number of the formed autocorrelation coefficients for future use;

wherein said means for combining is comprised of:

a current samples register for receiving and storing, in parallel, sequential occurring portions of said binary signal and for providing at its output, upon receipt of a most current sample at its input, a previous sample which is a previously received current sample;

a previous samples register for receiving the previous sample from said current samples register, wherein said previous samples register has a parallel output, and said current samples register is a parallel-in, parallel-out, shift register with a serial data bit input for shifting its output in response to serial data bits;

logic means coupled to the output of said current samples register and the output of said previous samples register for indicating the concurrence of like binary values within a previous sample portion and a current sample portion of said binary signal to form a frame of autocorrelated binary signals; and a parallel-to-serial holding register having its input coupled to the output of said previous samples register and its output coupled to said serial data input of the current samples register and for serially providing at its output the signals received from said previous samples register.

2. The autocorrelation processor according to claim 1 and further comprising:

an autocorrelation result register interposed between said logic means and said counting means to serially pass said autocorrelated binary signals to said counting means.

* * * * *